United States Patent [19]

Saito et al.

[11] 4,419,709
[45] Dec. 6, 1983

[54] CASE FOR A DISC-SHAPED RECORDING MEDIUM

[75] Inventors: Takashi Saito; Osamu Tajima; Masafumi Mochizuki, all of Yokohama, Japan

[73] Assignee: Victor Company of Japan, Ltd., Yokohama, Japan

[21] Appl. No.: 263,851

[22] Filed: May 14, 1981

[30] Foreign Application Priority Data

May 15, 1980 [JP] Japan .............................. 55-66678[U]

[51] Int. Cl.³ .......................... G11B 5/82; G11B 25/04
[52] U.S. Cl. ....................................... 360/133; 360/97; 206/444
[58] Field of Search .................. 360/133, 135, 97, 99; 206/444, 312, 309

[56] References Cited

U.S. PATENT DOCUMENTS 4,164,782  8/1979  Stewart ................................ 360/133
4,239,108 12/1980  Colman et al. ....................... 206/312
4,266,784  5/1981  Torrington .......................... 360/133

FOREIGN PATENT DOCUMENTS 55-52561  4/1980  Japan ................................... 360/133

Primary Examiner—Alfred H. Eddleman
Attorney, Agent, or Firm—Louis Bernat

[57] ABSTRACT

A case for a disc-shaped recording medium operates together with a disc-shaped recording medium reproducing apparatus provided with an inserting opening through which the case is inserted, a turntable for rotating the disc-shaped recording medium, and locking mechanism and engagement releasing mechanism provided at the innermost part of the disc-shaped recording medium reproducing apparatus opposite to the inserting opening with respect to the turntable. The case comprises a jacket having a space for accommodating the disc-shaped recording medium and an opening for allowing the disc-shaped recording medium to go in and out of the jacket, and a closing member inserted through the opening of the jacket for closing the opening of said jacket. The closing member unitarily has a pair of engaging arms on both sides thereof which can elastically bend. The closing member is locked by the locking mechanism upon insertion into the innermost part of the reproducing apparatus together wtih the jacket. The engaging arms and the jacket have a slipping out preventing engaging part for preventing the closing member from slipping out the jacket in a state where the closing member is inserted into a predetermined position within the jacket. The engagement releasing mechanism has engagement releasing members which relatively make contact with and push against sloping surfaces of the engaging arms for bending the engaging arms inwards, upon insertion of the closing member into the innermost part of the reproducing apparatus together with the jacket. The engaging arms and the engagement releasing members have a deviation preventing engaging part at least at a part where the engaging arms and the engagement releasing members respectively make contact, for preventing deviation within a plane perpendicular to a plane in which the closing member extends.

5 Claims, 7 Drawing Figures

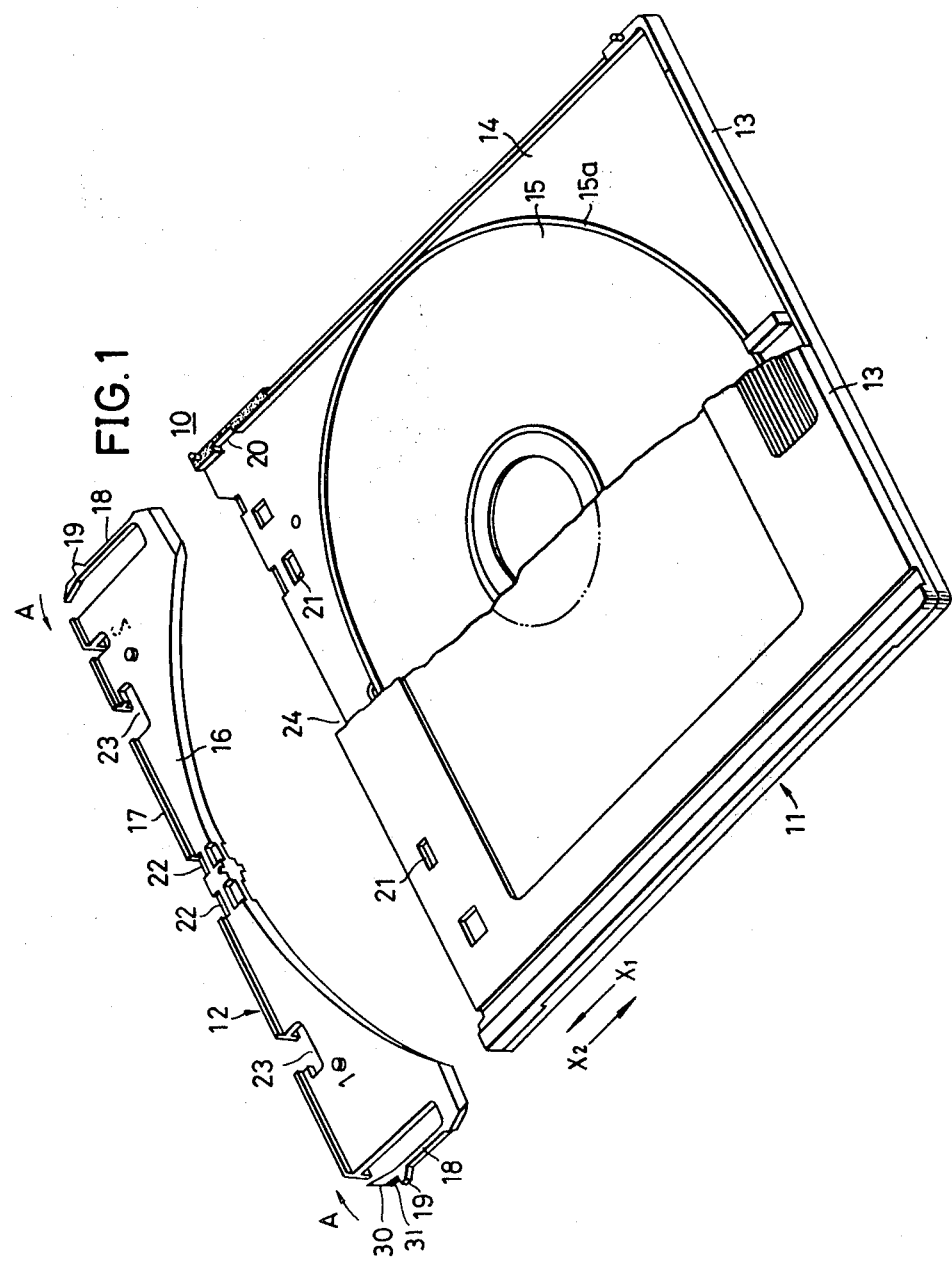

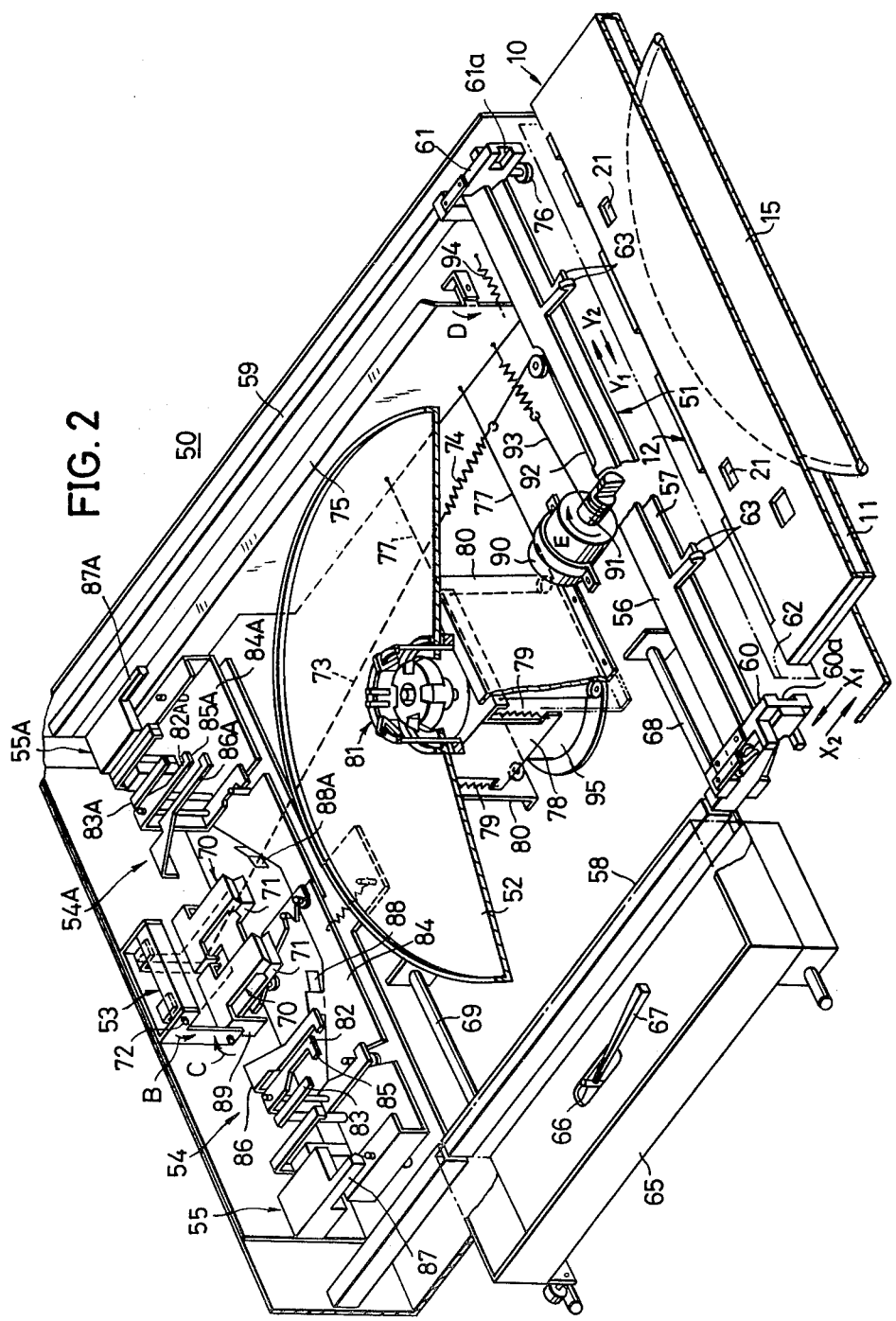

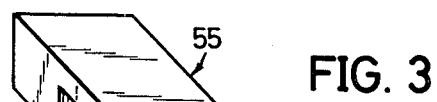
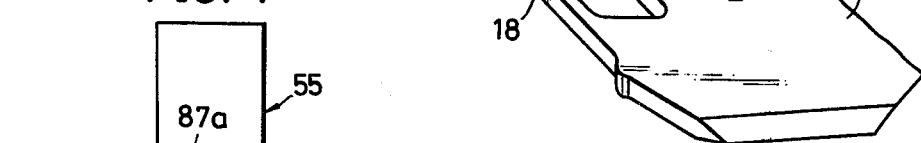
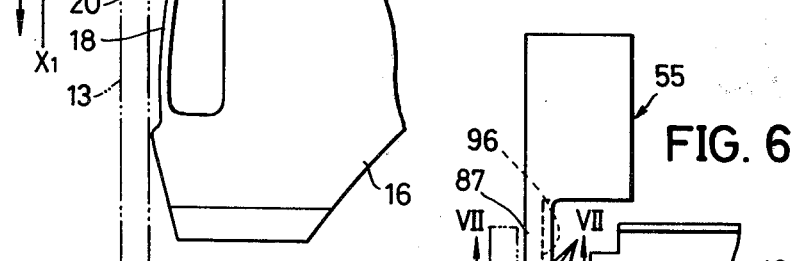
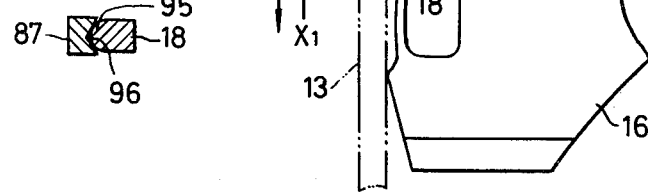

CASE FOR A DISC-SHAPED RECORDING MEDIUM

BACKGROUND OF THE INVENTION

The present invention generally relates to cases for disc-shaped recording mediums, and more particularly to a case for a disc-shaped recording medium comprising a jacket for accommodating a disc-shaped recording medium and a closing member for closing an opening of the jacket and having a construction in which the jacket and the closing member engage with each other, which operates together with a disc-shaped recording medium reproducing apparatus having releasing means for releasing the engagement between the jacket and the closing member and is constructed so that the closing member is positively prevented from displacing with the releasing means.

Conventionally, cases accommodating a disc-shaped recording medium (hereinafter simply referred to as a disc) such as a video disc recorded with video signals, and an audio disc recorded with pulse code modulated (PCM) audio signals, have been proposed. In this type of disc cases, a disc remains at a predetermined position within a reproducing apparatus by performing an operation in which a disc case having the disc accommodated therein is inserted within the reproducing apparatus and then pulled out from the reproducing apparatus, and by inserting the empty disc case into the reproducing apparatus, the disc within the reproducing apparatus is incased inside the disc case, to be obtained outside the reproducing apparatus.

The above conventional type of a disc case comprises a rigid jacket for accommodating a disc, and a tray having a front part which is held by holding means upon complete insertion of the disc case within the reproducing apparatus and an annular or ring portion fixed to the front part for encircling the outer periphery of the disc. Furthermore, an engaging mechanism was provided for engaging the tray and the jacket so that the tray does not slip out from the jacket, in a state where the tray is inserted within the jacket. When this disc case is inserted within the reproducing apparatus to a predetermined position, an engagement releasing mechanism releases the engagement of the above engaging mechanism, and the holding means of the reproducing apparatus holds the tray. Hence, when the jacket is pulled out from within the reproducing apparatus, the disc is held by the annular portion of the tray and relatively slipped out from the jacket at the above predetermined position, and the outer peripheral edge part of the disc rests on and is supported by a supporting mechanism within the reproducing apparatus. Then, a turntable relatively rises within the inner side of the supporting mechanism, and the disc is placed onto and is unitarily rotated with the turntable, to perform the reproduction. After completion of the reproduction, when the empty jacket is inserted into the reproducing apparatus, the disc is relatively inserted into the jacket together with the annular portion of the tray, and the holding operation of the holding means is released. Accordingly, when the jacket is pulled out from the reproducing apparatus, the disc and the tray is obtained outside the reproducing apparatus together with the jacket in a state in which the disc and the tray is incased inside the jacket.

Thus, in the above conventional disc case, the peripheral side surface of the disc is held by the engaged annular portion of the tray and the disc remains within the reproducing apparatus upon pulling of the jacket outside the reproducing apparatus. Accordingly, a supporting mechanism which is placed with the remaining disc thereon and supports the outer peripheral edge part of the disc, is provided in the reproducing apparatus. Hence, the turntable must be constructed so as to relatively move up-and-down within the inner side of the supporting mechanism. This means that the diameter of the turntable must be smaller than the diameter of the disc, and the outer peripheral edge part of the turntable thus makes contact with and supports the disc at the signal recording surface which is to the inner side of the outer peripheral edge part of the lower disc surface. Therefore, scratches are easily made on the signal recording surface part of the disc which is supported by the turntable, and especially when starting the rotation of the turntable, suffers a disadvantage in that scratches are more easily made in this case due to a force acting in a direction so as to rub the disc. Accordingly, when the disc is used many times, fine reproduction cannot be obtained due to the above scratches formed on the signal recording surface of the disc. Furthermore, the above tray comprises the annular portion for encircling the outer peripheral surface of the disc, and thus suffers disadvantages in that the construction of the disc case is complex, the manufacturing of the disc case is troublesome, and the disc case requires a large amount of material and cannot be manufactured at low cost. Moreover, upon reproduction, when a reproducing transducer of the reproducing apparatus moves to the position of the signal recording surface on the disc surface, the reproducing transducer must traverse over the annular portion of the tray. This traversing movement accordingly leads to a disadvantage in that the reproducing transducer moving mechanism must be designed so that the reproducing transducer does not collide with the annular portion, and the construction of the mechanism thus becomes complex. In addition, the conventional disc case suffered a disadvantage in that, when the disc is relatively pulled out from the jacket by the tray upon insertion and then pulling out of the jacket from within the reproducing apparatus, or when the disc is relatively inserted into the jacket by the tray upon insertion of the empty jacket and then pulling out of the jacket, the jacket rubs against the disc and scratches are easily introduced. Thus, in order to eliminate the disadvantageous features of the conventional case, a novel case was proposed in U.S. patent application Ser. No. 229,303 entitled "CASE FOR A DISC-SHAPED RECORDING MEDIUM" filed Jan. 28, 1981, and now issued as U.S. Pat. No. 4,360,845, in which the assignee is the same as that of the present application.

A case for a recording medium operates together with recording medium reproducing apparatus provided with an inserting opening through which the case is inserted, a lid plate engagement releasing member, a lid plate holding member, and a disc clamping member provided at the innermost part of the recording medium reproducing apparatus opposite to the inserting opening with respect to a turntable which rotates the disc, and a jacket opening enlarging member provided in the vicinity of the inserting opening, capable of moving between the position in the vicinity of the inserting opening and the innermost part of the recording medium reproducing apparatus above the turntable. The case comprises a jacket having a space for accommodating the disc and an opening for allowing the disc to go in and out of the jacket, and a lid plate inserted through the opening of the jacket for closing the opening of the jacket, and further has a mechanism for engaging the lid plate and the jacket. Upon insertion of the case into the reproducing apparatus through the inserting opening, the engagement of the lid plate with respect to the jacket is released by the engagement releasing member, and the opening of the jacket is enlarged by the jacket opening enlarging member within the cutouts of the lid plate. The lid plate is held by the holding member. When the jacket is inserted into the innermost part of the reproducing apparatus, the clamping member enter from the enlarged opening of the jacket, to clamp the disc within the jacket. The jacket is pulled out in an empty state leaving behind the lid plate held by the lid plate holding member and the disc clamped by the disc clamping member, when the jacket is pulled out from within the reproducing apparatus in a direction opposite to the direction of the insertion.

In both the conventional and the proposed case for a disc-shaped recording medium, the tray or the lid plate is constructed to engage with the jacket. Accordingly, as the case is inserted into the innermost part of the reproducing apparatus, the case is constructed so that the case relatively makes contact with an engagement releasing member provided at the innermost part of the reproducing apparatus, to release the above engagement.

However, in both the above cases for a disc-shaped recording medium, the engaging member of the tray or the lid plate and the engagement releasing member of the reproducing apparatus respectively have vertical surfaces with respect to the horizontal plane, and these members were constructed so that the engagement releasing member relatively made contact with the engaging member to push and displace the engaging member within the horizontal plane. In a state where the empty jacket is pulled out from the reproducing apparatus leaving behind the tray or the lid plate and the disc inside the reproducing apparatus, the tray or the lid plate is clamped or held by the clamping member or the holding member.

In a state where the above tray or the lid plate is clamped or held, the above engagement releasing member only makes contact with the engaging member in a direction within the horizontal plane. Therefore, when a shock is exerted against the reproducing apparatus from the outside, the engaging member deviates in the vertical direction with respect to the engagement releasing member, and the tray or the lid plate is inclined. In extreme cases, the engaging member separated from the engagement releasing member. When the engaging member is displaced from the correct position with respect to the engagement releasing member as described above, the recovering operation to recover the disc and the tray or the lid plate within the jacket cannot be performed positively, since the tray or the lid plate is sometimes not relatively inserted smoothly into the jacket, or the jacket is sometimes not inserted into the predetermined position due to contact between the jacket and the engagement releasing member, upon insertion of the empty jacket inside the reproducing apparatus to recover the disc and the tray or the lid plate within the reproducing apparatus.

SUMMARY OF THE INVENTION

Accordingly, a general object of the present invention is to provide a novel and useful case for a disc-shaped recording medium in which the above described problems have been overcome.

Another and more specific object of the present invention is to provide a case for a disc-shaped recording medium which is constructed to positively perform the engagement between a closing member such as a tray or a lid plate which closes the opening of a jacket, and an engagement releasing member of a reproducing apparatus which releases the engagement of the closing member with respect to the jacket, in a state where the engagement of the closing member with respect to the jacket is released. According to the case of the present invention, even when a shock is exerted against the reproducing apparatus from the outside, the closing member is not displaced from the engagement releasing member since the closing member is positively fixed by the engagement releasing member, and thus, the insertion of the empty jacket within the reproducing apparatus and the recovering of the disc-shaped recording medium and the closing member into the jacket can respectively be performed smoothly and positively.

Other objects and further features of the present invention will be apparent from the following detailed description when read in conjunction with the accompanying drawings.

BRIEF DESCRIPTION OF THE DRAWINGS

FIG. 1 is a partly cut away and exploded perspective view of an embodiment of a disc case according to the present invention;

FIG. 2 is a perspective view showing an example of an inner construction of a disc reproducing apparatus, with a part cut away;

FIG. 3 is a perspective view showing a first embodiment of a lid plate engaging member and an engagement releasing member which form an essential part of the disc case according to the present invention;

FIG. 4 is a plan view showing a contact state between the engaging member and the engagement releasing member shown in FIG. 3;

FIG. 5 is a cross-sectional diagram showing the plan view shown in FIG. 4 along a line V—V;

FIG. 6 is a plan view showing a second embodiment of a lid plate engaging member and an engagement releasing member; and FIG. 7 is a cross-sectional diagram showing the plan view shown in FIG. 6 along a line VII—VII.

DETAILED DESCRIPTION

FIG. 1 shows an embodiment of a disc case of the present invention, where a disc case 10 comprises a jacket 11 and a lid plate 12.

The jacket 11 is assembled from a pair of jacket halves 13 and 13, and comprises a flat cavity of space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. A projection 19 which engages with a depression 20 of the jacket 11, is provided at the outer side on each of the engaging arm 18, and a sloping surface 30 is formed at the tip end on each of the engaging arm 18. As shown in FIGS. 3 and 4, the base portions of the engaging arms 18 are unitarily formed on the rear end of the main lid body 16 and extend in the forward direction, while the free ends of the engaging arms 18 can undergo resilient distortion in the direction of the arrow A. A groove 31 having a cross-sectional shape shown in FIG. 5, is formed at the outer side of the arm part of the engaging arm 18 in front of the projection 19.

The projection 19 has a slant surface 19a and a vertical surface 19b. When the lid plate 12 enters into the jacket 11 from an opening 24, the slant surface 19a of the projection 19 makes contact with the front end side wall of the jacket 11, and thus, the engaging arm 18 is distorted inward. Upon insertion of the lid plate 12 into a predetermined position within the jacket 11, the projection 19 engages into the depression 20 in the side wall of the jacket 11, due to the flexibility of the engaging arm 18. Accordingly, the vertical surface 19b becomes fixed at the inner surface of the depression 20, and the lid plate 12 is thus prevented from slipping out from the jacket 11.

As shown in FIG. 2, a reproducing apparatus 50 substantially comprises a jacket opening enlarging mechanism 51, a turntable 52 to rotate the disc 15 positioned thereon, a disc holding mechanism 53 for clamping the disc 15, a lid plate locking mechanism 54 for locking the lid plate 12, an engagement releasing mechanism 55 for releasing the engagement of the lid plate 12 with respect to the jacket 11, and the like.

The jacket opening enlarging mechanism 51 comprises upper and lower beams 56 and 57 extending in the directions of the arrows Y1 and Y2, and supporting members 60 and 61 (sliders) which are respectively fixedly inserted into guide rails 58 and 59, to support both ends of the respective beams 56 and 57. The jacket opening enlarging mechanism 51 is guided by guide rails 58 and 59, and moves between the innermost part of the reproducing apparatus 50 and a disc case inserting opening 62 provided at the frame of the reproducing apparatus 50, in the directions of the arrows X1 and X2. Enlarging fingers 63 are respectively formed on each of the beams 56 and 57, directed towards the inserting opening 62.

A pickup frame 65 is provided with a reproducing stylus 66 and a cantilever 67, and moves in the directions of the arrows Y1 and Y2 along a pair of guide rods 68 and 69.

The lid plate locking mechanism 54 and the engagement releasing mechanism 55 are constructed symmetrically on the left and right sides with respect to a line which passes through the center of the turntable in the direction of the arrow X1. The parts on the right side are designated by the same reference numerals as the corresponding parts on the right side, with a subscript "A", and their description will be omitted.

The disc holding mechanism 53 is provided at the inner part of the reproducing apparatus 50 on the opposite side of the inserting opening 62, and comprises a pair of upper and lower holding fingers 70 and 71. The lower holding finger 71 is axially supported on an upper pin 72. A wire 73 is linked to the holding finger 71, and the holding finger 71 receives a rotational force in the direction of arrow B due to the force of a spring 74. Accordingly, the holdng finger 71 receives a force urging rotation in the upward direction.

Upon reproduction of the disc 15, the disc case 10 is inserted through the inserting opening 62 of the reproducing apparatus 50, by inserting the disc case 10 with the side of the lid plate 12 into the direction of the arrow X1. When the jacket opening enlarging mechanism 51 is pushed and moved in the direction of the arrow X1 by the disc case 10, the enlarging mechanism 51 moves, the upper and lower beams 56 and 57 rotate, and the enlarging fingers 63 thus respectively move in a direction to mutually separate from each other. Accordingly, the tip ends of the enlarging fingers 63 engage with engaging windows 21 of the jacket 11, and enlarge the front part of the upper and lower jacket halves 13 upwards and downwards, to enlarge the opening 24.

A sloping surface of a rotary plate 75 is pushed by a roller 76 provided on the slider 61, and the rotary plate 75 rotates in the direction of the arrow D, due to the movement of the jacket opening enlarging mechanism 51. Accompanied by the rotation of the rotary plate 75, a wire 77 is pulled, and a push-up plate 78 is accordingly pulled downwards. Four corners of the push-up plate 78 are suspended and supported by springs 79 with respect to a support plate 80. Due to the downward movement of the push-up plate 78, a disc clamping mechanism 81 moves downwards, to retreat from the insertion passage of the disc case 10.

When the disc case 10 is inserted into the innermost part of the reproducing apparatus 50 together with the enlarging mechanism 51 through the upper side of the turntable 52, ride-over parts 22 of the lid plate 12 enter between the holding parts which are positioned mutually opposite to the holding fingers 70 and 71, and pass through these holding parts by pushing and spreading these parts. The holding fingers 70 and 71 close, as will be described hereinafter, after the ride-over parts 22 of the lid plate 12 have passed through, and the holding parts accordingly clamp a groove guard 15a of the disc 15.

Accompanied by the insertion of the disc case 10, locking fingers 82 and 82A relatively enter inside L-shaped cutouts 23 of the lid plate 12, and the rim portion 17 accordingly pushes contact fingers 83 and 83A. When the contact fingers 83 and 83A are pushed by the lid plate 12, main levers 84 and 84A respectively rotate to be latched. Furthermore, the locking fingers 82 and 82A rotate in directions so as to mutually separate from each other, and L-shaped parts 85 and 85A provided at the tip ends of the above locking fingers 82 and 82A respectively enter into the innermost parts of the cutouts 23, to lock the lid plate 12. The lid plate 12 is limited of its movement in the direction of the arrow X1 by the contact fingers 83 and 83A, and the lid plate 12 is thus locked and supported at the innermost part of the reproducing apparatus 50 in a state in which the lid plate 12 is placed and supported on supporting fingers 86 and 86A.

Furthermore, accompanied by the insertion of the disc case 10, engagement releasing members 87 and 87A of the engagement releasing mechanisms 55 and 55A enter inside the openings on the right and left sides of the disc case 10, and relatively push the sloping surfaces 30 at the tip ends of the engaging arms 18 of the lid plate 12, as shown in FIG. 4. Accordingly, the engaging arms 18 are respectively distorted in the direction of the arrow A, and the projections 19 respectively slip out from the depressions 20, to release the engagement of the lid plate 12 with respect to the jacket 11.

The engagement releasing member 87 comprises an arm part which extends linearly towards the direction of the arrow X2 opposite with respect to the inserting direction of the jacket 11 which is in the direction of the arrow X1. A rounded edge part 87a which its and engages with the groove 31 of the engaging arm 18 of the lid plate 12, is formed at the inner side of the engagement releasing member 87.

Accordingly, when the disc case 10 is inserted into the innermost part of the reproducing apparatus, the engaging arm 18 is relatively pushed and moved by the engagement releasing member 87 and undergoes elastic deformation, and as shown in FIGS. 4 and 5, the rounded edge part 87a of the engagement releasing member 87 fits into the groove 31 at the tip end of the engaging arm 18. Hence, in a state where the engaging arm 18 is deformed and the engagement of the projection 19 with respect to the depression 20 is released, the movement of the engaging arm 18 in the up-and-down direction is restricted due to the fit between the groove 31 and the rounded edge part 87a.

When the main levers 84 and 84A rotate to positions where they are latched, the leaf springs 88 and 88A respectively provided at the bent parts of the main levers push against a vertically extending part 89 of the upper holding finger 70. Hence, a rotational force in the direction of the arrow C is applied to the holding finger 70. Thus, the disc 15 is held at a predetermined height by the holding finger 71 and 70.

Accordingly, when the disc case 10 is inserted into the final position, the engagement of the lid plate 12 with respect to the jacket 11 is released, and the disc 15 thus becomes locked by the locking fingers 82 and 82A, and held by the holding fingers 70 and 71.

Next, the jacket 11 is pulled out in the direction of the arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11. Accompanied by the movement of the jacket 11 in the direction of the arrow X2, the jacket opening enlarging mechanism 51 also moves together with the jacket in the direction of the arrow X2.

When the jacket 11 is pulled out to the vicinity of the inserting opening 62, the rotary plate 75 rotationally returns and the disc clamping mechanism 81 moves up to support the center part of the disc 15. Furthermore, when the jacket 11 is pulled out, the disc 15 completely separates from the jacket 11, the jacket opening enlarging mechanism 51 returns to its original position, and the jacket opening enlarging fingers 63 rotate in directions so as to mutually close upon each other and separate from the engaging windows 21. The jacket 11 returns to its original state due to its flexibility, and the enlarged opening also returns to the original state, and the jacket 11 is completely pulled out from the reproduction apparatus 50. In this state, the disc 15 is supported horizontally at a position above the turntable 52, by the holding fingers 70 and 71 and the disc clamping mechanism 81.

When a play button (not shown) is then pushed, a motor 90 begins to rotate, and a take-up shaft 91 rotates in the direction of arrow E, and hence wires 92 and 93 are thus pulled out from the take-up shaft 91. Accordingly, the holding finger 71 rotates in a direction opposite to the direction of the arrow B, to release the clamping with respect to the disc 15. Further, the rotary plate 75 is rotated in the direction of the arrow D by a tension spring 94, to move the disc clamping mechanism 81 downwards. Hence, the disc 15 moves down and is placed on the turntable 52, and held by the disc holding mechanism 53 which will be described hereinafter. The pickup frame 65 moves in the direction of the arrow Y1 from the waiting position, and the turntable 52 is rotated by a motor 95. Thus, the disc 15 is relatively scanned by the reproducing stylus 66, to reproduce the information signal.

The movement of the lid plate 12 within the horizontal plane including movements along the directions of the arrows X1 and X2, is restricted due to the engagement of the locking fingers 82 and 82A with the cutouts 23. Further, the movement of the lid plate 12 within a plane perpendicular to the above horizontal plane is also restricted, due to the engagement releasing member 87 which fits into the groove 31 of the engaging arm 18. Accordingly, even when a shock is exerted against the reproducing apparatus 50 from the outside, the engagement between the engaging arm 18 and the engagement releasing member 87 is maintained, to positively fix and hold the lid plate 12 at a predetermined position.

Next, an operation in which the disc 15 is recovered from within the reproducing apparatus 50, will now be described.

Upon completion of the reproducing operation, the motor 90 rotates in a direction opposite to the direction as the above after the motor 95 and the turntable 52 stop rotating, and the take-up shaft 91 takes up the wires 92 and 93. Accordingly, the rotary plate 75 rotates in a direction so as to loosen the wire 77, and the disc clamping mechanism 81 thus moves up to push the disc 15 up. Furthermore, the holding finger 71 rotates in the direction of the arrow B, to hold the disc 15.

Upon recovering of the disc 15, the empty jacket 11 is inserted with its front end first into the reproducing apparatus 50 through the inserting opening 62. The jacket opening enlarging mechanism 51 is pushed by the jacket 11 and moves again in the direction of the arrow X1, to enlarge the opening of the jacket 11. Accompanied by the insertion of the jacket 11 in the direction of the arrow X1, the disc 15 is relatively inserted inside the jacket 11 through the opening.

When the jacket 11 is inserted into the innermost position inside the reproducing apparatus 50, the disc 15 becomes completely incased within the jacket 11, and furthermore, the locked lid plate 12 closes the opening of the jacket 11. In addition, the latching of the main levers 84 and 84A are released, and as the jacket 11 is pulled out in the direction of the arrow X2, the main levers 84 and 84A rotationally return to the original positions. Moreover, the contact fingers 83 and 83A respectively push and move the lid plate 12, the engaging arms 18 of the lid plate 12 separate from the engagment releasing members 87 and 87A, and the projection 19 again engages with the depression 20 of the jacket 11 since the engaging arm 18 rotationally returns to the original position. Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 50 to be recovered within the disc case 10.

Upon recovering of this lid plate 12 and the disc 15, the front end of the jacket 11 does not unnecessarily make contact with the rear end of the lid plate 12, the engaging arms 18, and the like, since the lid plate 12 is positively fixed and held at a predetermined position as described above. Therefore, the lid plate 12 is positively inserted within the empty jacket 11.

Next, an essential part of a second embodiment of a disc case according to the present invention will be described in conjunction with FIGS. 6 and 7. In FIGS. 6 and 7, those parts which are the same as those corresponding parts in FIGS. 4 and 5 will be designated by like reference numerals, and their description will be omitted. In the present embodiment of the invention, a projecting edge portion 95 having a cross-sectional shape shown in FIG. 7, is formed at the outer side of the arm part in front of the projection 19 of the engaging arm 18. A groove 96 into which the above projecting edge portion 95 of the engaging arm 18 is inserted, is formed at the inner side of the engagement releasing member 87.

Upon insertion of the case 10 into the innermost part of the reproducing apparatus, when the tip end of the engaging arm 18 of the lid plate 12 makes contact with the engagement releasing member 87 and the engaging arm 18 is relatively pushed and moved towards the direction of the arrow A, the projecting edge portion 95 of the engaging arm 18 fits into the groove 96 of the engagement releasing member 87. Hence, the same effects as those obtained in the above first embodiment of the invention can be obtained in this second embodiment of the invention.

Further, this invention is not limited to these embodiments but various variations and modifications may be made without departing from the scope of the invention.

What is claimed is:

1. A case for a disc-shaped recording medium used in a reproducing apparatus, said reproducing apparatus having an inserting opening through which said case is inserted, a turntable for rotating said disc-shaped recording medium, and locking means and engagement releasing means at the innermost part of said reproducing apparatus and opposite to said inserting opening, with said turntable positioned between said innermost part and said opening, said case comprising:
   a jacket having a space for accommodating said disc-shaped recording medium and an opening for enabling said disc-shaped recording medium to go in and out of said jacket; and
   a closing member inserted through said opening of said jacket for closing said opening of said jacket, said closing member unitarily having a pair of bendable elastic engaging arms on both sides thereof,
   said closing member being locked by said locking means upon insertion into said innermost part of said reproducing apparatus together with said jacket,
   said engaging arms and said jacket having means for preventing said closing member from slipping out of said jacket when said closing member is inserted into a predetermined position within said jacket,
   said engagement releasing means having engagement releasing members which make contact with and push against sloping surfaces of said engaging arms for bending said engaging arms inwardly, upon an insertion of said closing member into the innermost part of said reproducing apparatus, together with said jacket;
   said engaging arms and said engagement releasing members having a deviation preventing engaging part at least at a part where said engaging arms and said engagement releasing members respectively make contact, for preventing a deviation so that said engaging arms and said engagement releasing members do not miss each other within a plane which is perpendicular to a plane in which said closing member extends.

2. A case for a disc-shaped recording medium as claimed in claim 1 in which each of said engagement releasing members which construct said deviation preventing engaging part has a projecting edge part at the inner side surface, and each of said engaging arms has a groove provided at the outer side surface of said engaging arms into which the projecting edge part of said engagement releasing members fits.

3. A case for a disc-shaped recording medium as claimed in claim 1 in which each of said engagement releasing members which construct said deviation preventing engaging part has a groove at the inner side surface, and each of said engaging arms has a projecting edge part provided at the outer side surface of said engaging arms which fits into the groove of said engagement releasing members.

4. A case for a disc-shaped recording medium as claimed in claim 1 in which said reproducing apparatus is further provided with a disc-shaped recording medium clamping member provided at the innermost part of said reproducing apparatus opposite to said inserting opening with respect to said turntable, and a jacket opening enlarging member provided in the vicinity of said inserting opening, capable of moving between the position in the vicinity of said inserting opening and said innermost part of said reproducing apparatus above said turntable,
   said closing member comprising a lid plate for restricting the movement of said disc-shaped recording medium only in a direction to prevent said disc-shaped recording medium from slipping out of said jacket through the opening of said jacket,
   said opening of said jacket being enlarged by said jacket opening enlarging member upon insertion of said jacket inside said reproducing apparatus through said inserting opening,
   said lid plate being locked by said locking means and restricted of the movement in the directions along the inserting and pulling out directions of said jacket, upon insertion into said innermost part of said reproducing apparatus together with said jacket,
   said lid plate further having a ride-over part for allowing said disc-shaped recording medium clamping member to ride over said lid plate and enter from the enlarged opening of said jacket and clamp said disc-shaped recording medium inside said jacket upon insertion of said lid plate into said innermost part of said reproducing apparatus together with said jacket, and
   said jacket being pulled out in an empty state leaving behind said lid plate locked by said locking means and prevented of the deviation by said deviation preventing engaging part and said disc-shaped recording medium clamped by said disc-shaped recording medium clamping member, when said jacket is pulled out from within said reproducing apparatus in a direction opposite to the direction of the insertion.

5. A case for a disc-shaped recording medium as claimed in claim 1 in which said slipping out preventing engaging part has a projecting part provided at the outer side of said engaging arms and a depression part provided in the vicinity of said opening on both sides of said jacket, which engages with the projecting part of said engaging arms of said closing member and is released of the engagement when said engaging arms bend inwards.

* * * * *